Dec. 25, 1928.
E. F. SMART
AUTO SIGNAL
Filed July 28, 1926
1,696,890
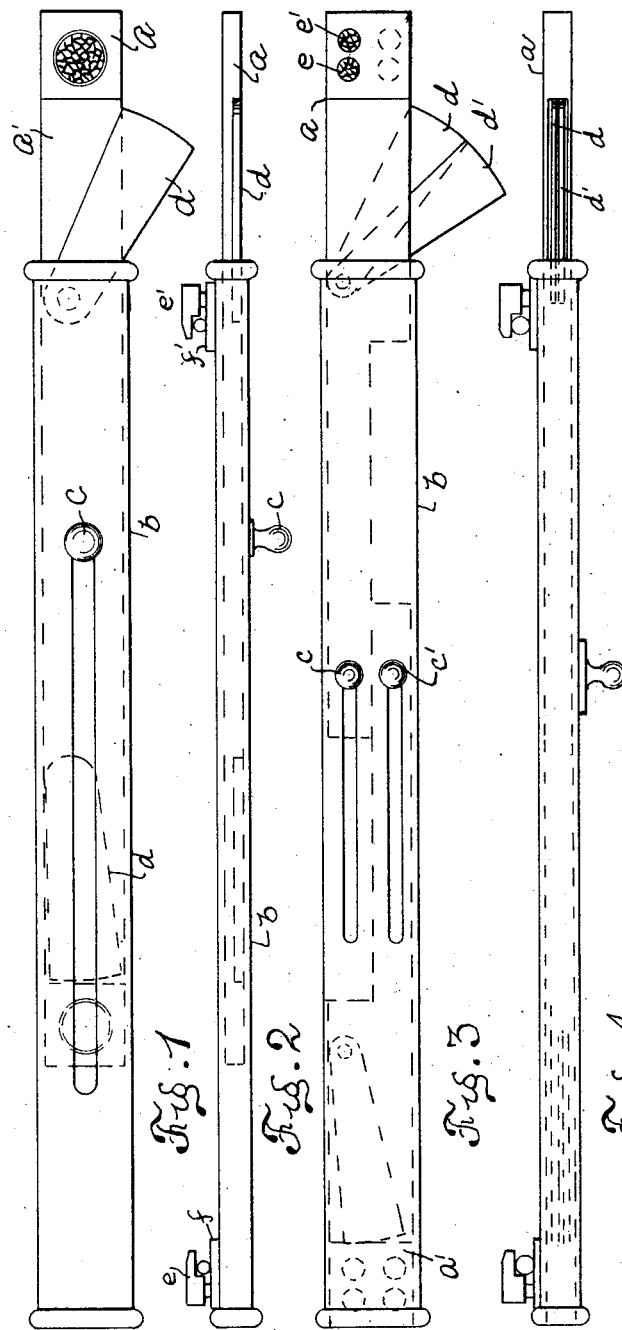
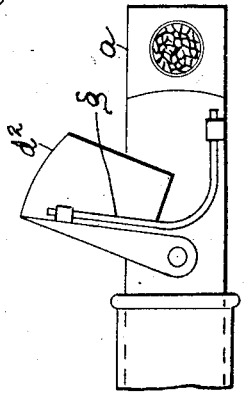
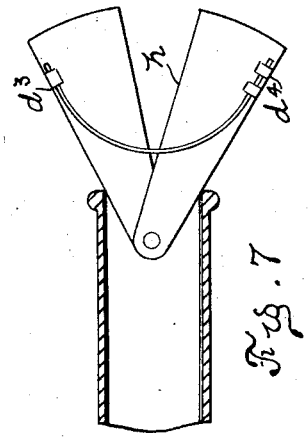
INVENTOR
Edmund Francis Smart
BY
ATTORNEY Patented Dec. 25, 1928.

1,696,890

UNITED STATES PATENT OFFICE.

EDMUND FRANCIS SMART, OF WALLSEND-ON-TYNE, ENGLAND, ASSIGNOR OF ONE-HALF TO JAMES WILLIAM HARTLEY, OF BROOKLYN, NEW YORK.

AUTO SIGNAL.

Application filed July 28, 1926, Serial No. 125,397, and in Great Britain July 14, 1925.

This invention relates to signalling devices for use on road vehicles and the like, and has for its object to provide a device of simple construction and operation which will be visible on either side of a vehicle at substantially the same positions occupied by a driver's hand when signalling to oncoming vehicles by stretching out the hand.

The device according to the present invention consists in a sliding member and means whereby the said member may be readily moved in either direction so as to project at one or other side of the vehicle according to the direction to be taken. Stops are preferably provided for limiting the movement of the sliding member.

One or more pivoted arms may be provided at each extremity of the sliding member so that when it is moved in either direction the said arms move through an angle and present a larger signalling surface, while when the sliding member is in the neutral or unexposed position, the said arms are in alignment with the sliding member. Where there are two or more of such arms at each end of the sliding member means are provided for causing the arms so spread fanwise when in the signalling position. The said arms may be provided with means for closing the intervening space between them; for example they may be connected by flexible webbing, the object being to present a large amount of obstruction to the view of the drivers of oncoming vehicles.

The means for operating the sliding member may comprise a handle rigid with the sliding member, or a lever mechanism, cords and pulleys or electro-magnetic means.

According to a preferred form, two sliding members are provided one for each direction, this arrangement reducing the distance through which the driver requires to move his hand when operating the device by hand.

This application is for the same general subject matter as set forth in this applicant's British Patent No. 263,896, accepted in the British Patent Office January 13, 1927.

The following is what I consider the best means for carrying out my invention, and the accompanying drawings should be referred to for a complete understanding of the specification which follows.

In the drawings:—

Fig. 1, is a view in elevation of a signalling device according to the present invention in which a single sliding member is used with a pivoted arm at each end.

Fig. 2, is a plan of Fig. 1 viewed from beneath.

Fig. 3, is a view in elevation of a form of construction in which two sliding members are used.

Fig. 4, is a plan of Fig. 3 viewed from beneath.

Fig. 5, is a fragmentary view in elevation, showing an alternative construction of the pivoted arms.

Figs. 6 and 7, are fragmentary views in elevation showing another alternative construction of the pivoted arms.

Referring more particularly to Figs. 1 and 2 of the drawing, $a$ indicates a sliding member slidable in a tubular member $b$. These members are hereinafter referred to as the "slide" and "tube" respectively. The tube $b$ is slotted to receive a handle or knob $c$ secured to the slide $a$. Adjacent each of the ends of the slide $a$ there is mounted a pivoted semaphore arm $d$ which lies in a cut away portion at $a^1$ in the said slide. The device is secured to the dash board of the vehicle by means of clamps $e$, $e^1$ which are slidable in grooved members $f$, $f^1$ rigid with the tube $b$.

The operation of the device consists in moving the knob $c$ either to right or left according to the direction of turning to be indicated. As the slide $a$ approaches one of the extremities of its travel, the corresponding arm $d$ drops by gravity to the position shown in Fig. 1, an abutment $a^2$ limiting the amount of drop of the said arm. The slide $a$ and arms $d$ are preferably covered with a light-reflecting material in order to show up against the surrounding objects, for example they may be painted white, with luminous paint if desired, or they may be highly burnished or plated with a white metal such as nickel in the event of the device being made in metal.

Figs. 3 and 4 show a preferred form of construction according to which there are two slides $a$, $a^1$ slidably mounted in the tube $b$, the slide $a$ being operated by means of the knob $c$ and the slide $a^1$ by means of the knob $c^1$. Reflectors or lamps $e$, $e^1$ are provided for showing up at night. Two semaphore arms $d$, $d^1$ are provided at the outer end of each of the slides $a$, $a^1$, and these are housed inside the slide $a$ as shown in such a way as to prevent the access of weather, the downward opening in the slide $a$ contributing to this end. Stops (not shown) are provided for limiting the movement of the arms $d$, $d^1$ so as to effect the fanwise opening thereof as shown. The inner portions of the slides $a$, $a^1$ may be in contact, but preferably they are separated by a partition strip.

With this form when the driver wishes to indicate that he is going to turn to the right, he moves the knob $c$ so as to make the arm $a$ project as shown in Fig. 3; while for the left he moves the knob $c^1$ which causes the slide $a^1$ to project from the other end of the tube $b$. The driver thus does not require to stretch out the hand as far as in the device shown in Figs. 1 and 2, the inner ends of the slides being made to overlap as shown so that whichever slide is to be shown, the driver's movement is the same, the action being a pull in the case of the slide $a$ and a push in the case of the slide $a^1$. A further advantage with this form is that both slides may be shown at once to indicate a "Stop."

Fig. 5 shows an alternative method of mounting the semaphore arms at the ends of the slide. In this construction a semaphore arm $d^2$ is mounted to pivot in an upward direction under the influence of a spring $g$ when the slide is moved to its outer limit, the arm $d^2$ being moved into alignment with the slide $a$ against the action of the spring when the said slide is moved to its inner limit.

Figs. 6 and 7 show a further alternative method of mounting the semaphore arms. In this case a pair of arms $d^3$, $d^4$ have a spring $h$ arranged between them so that as the slide is moved to its outer limit the said arms arrange themselves symmetrically about the centre line of the device. Fig. 7 shows the slide in its inner position and Fig. 6 at its outer limit.

In all the arrangements above set forth the driver has to restore the slides to the neutral position by a further movement of the operating handles or knobs. However, if desired, the slides may be made to work against springs so that on releasing the knobs the slides will automatically move to the neutral position; while by providing spring detents the handles may be released without the slides returning to neutral position, and the driver has both hands free, subsequent actuation of the detents effecting the restoration of the slides to neutral position.

The member $b$ in which the slide $a$ works need not be confined to a tubular form. It may comprise an open framework longitudinal members of which support the slide which is maintained in position by means of short transverse members joining the said longitudinal members. Or, the mid portions only of the framework may be open, the end portions completely enclosing the slide as shown.

Having carefully and fully described my invention, what I claim and desire to obtain by Letters Patent is:—

1. A signalling device for use on road vehicles and the like, comprising a plurality of sliding members and means whereby said members may be readily moved in either direction so as to project one at each side of the vehicle, pivoted arms adjacent to the outer end of each said sliding member and adapted to operate to increase the area of said signalling means.

2. A signalling means comprising a casing, a plurality of sliding members arranged within said casing and adapted to be ejected at either side of said casing, pivoted arms of a width equal to said sliding member and arranged one on each said sliding member and adapted to be moved away from the surface of said sliding member upon the movement of said sliding member and to be returned over said sliding member when said sliding member is withdrawn into said casing.

Signed at Newcastle-on-Tyne, England, this 29th day of June, 1926.

E. F. SMART.